United States Patent
Hsu et al.

(10) Patent No.: US 6,824,272 B2
(45) Date of Patent: Nov. 30, 2004

(54) BLOWHOLE COVER STRUCTURE

(75) Inventors: Shih-Lung Hsu, Jungli (TW); Ying-Yu Lin, Luodung Jen (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/336,209

(22) Filed: Jan. 3, 2003

(65) Prior Publication Data

US 2003/0128340 A1 Jul. 10, 2003

(30) Foreign Application Priority Data

Jan. 7, 2002 (TW) .......................... 91100112 A (51) Int. Cl.⁷ .......................... G03B 21/16; G03B 21/20; F21V 29/00; F21V 7/20; F28D 7/02
(52) U.S. Cl. .......................... 353/61; 349/161; 165/80.3; 362/264; 362/294; 362/342; 362/345; 362/373; 352/202
(58) Field of Search .......................... 353/52, 57, 60, 353/61, 119, 58, 56, 55; 349/161; 165/80.3; 362/240, 294, 341, 342, 345, 346, 373, 264; 352/202; 348/842

(56) References Cited

U.S. PATENT DOCUMENTS 5,842,761 A * 12/1998 Futakami et al. ........... 353/119

\* cited by examiner

*Primary Examiner*—David Gray
*Assistant Examiner*—Rochelle Blackman
(74) *Attorney, Agent, or Firm*—Snell & Wilmer L.L.P.

(57) ABSTRACT

The present invention provides a cover structure and an image output apparatus including the cover structure. The cover structure may be disposed on the image output apparatus for discharging and guiding the heated airflow inner the image output apparatus. The cover structure includes a first device and a second device. The first device is disposed on a housing of the image output apparatus and corresponds to a blowhole of the housing to mask a portion of the light emitted from the blowhole. The other portion of the light leaks from the first device to form a leakage light. The second device corresponds to an outer side of the first device to mask the leakage light.

8 Claims, 8 Drawing Sheets

BLOWHOLE COVER STRUCTURE

This application claims priority of Taiwan Patent Application No. 091100112 filed on Jan. 7, 2002.

1. Field of Invention

The present invention relates to a cover structure and an image output apparatus including the cover structure.

2. Background of the Invention

The current trend of information presentation moves toward the multimedia approach, and image output apparatus is indispensable in this trend. There are many kinds of image output apparatus in the market, such as a projector, an overhead projector, and a slide projector. However, these apparatus all have similar problems of discharging of heat generated by the lamp within the apparatus.

Generally, a blowhole is provided in the apparatus to discharge the heat. However, light within the apparatus may leak from the blowhole to deteriorate the quality of output image. Therefore, the issue of leakage light should be considered while designing the blowhole. Conventionally, a plastic plate with multiple vents is deployed as a cover for the apparatus. Additionally, a fan may be arranged to cooperate with the plastic plate, such that the fan may discharge the airflow from the vents. On the plastic plate, a vane is arranged between locations of two vents to direct the discharged airflow to a desired direction. The other purpose of the vanes is to mask a portion of light, which leaks from the blowhole.

An advantage of this design is that the plastic cover may be made by mold method, and a length of the vanes may be such that they completely mask the light. However, the flow resistance encountered while discharging the airflow may increase due to the fact that the thickness of the plastic vane is large.

Another design for the cover is using a metal plate to substitute for the plastic plate. Multiple vanes and vents are formed by pressing the metal plate. The flow resistance encountered while discharging the airflow is reduced due to the thickness of the metal plate being smaller than plastic plate. However, the vanes of this type may not mask the leaking light completely. Therefore, a portion of light may leak from the cover and deteriorate the quality of the output image.

SUMMARY OF THE INVENTION

One aspect of the present invention is providing a cover structure disposed on an image output apparatus to discharge and to guide heated airflow within the image output apparatus.

Another aspect of the present invention is providing a cover structure to mask light leaking from a blowhole of the image output apparatus.

Another aspect of the present invention is providing a cover structure for reducing the resistance generated by discharging the heat air.

The present invention provides a cover structure disposed on the image output apparatus for discharging and guiding the heated airflow. The image output apparatus includes a housing and a lamp disposed within the housing. The housing further includes a blowhole. Additionally, the cover structure is provided to mask light emitting from the blowhole.

The cover structure includes a first device and a second device. The first device is disposed on the housing and corresponds to the blowhole to mask a portion of the light of the lamp emitting from the blowhole. The other portion of the light emitted from the lamp leaks from the first device to from a leakage light. The second device corresponds to an outer side of the first device to mask the leakage light.

The first device further includes at least one first vane and at least one first vent. And the second device includes at least one second vane and at least one second vent. In a preferred embodiment, the second vane may passage of the first vane such that the second vane may mask the leakage light leaking from the first device.

The present invention also provides an image output apparatus including the cover structure described above.

This and other aspects of the present invention will become clear to those of ordinary skill in the art after having read the following detailed description of the preferred embodiment which is illustrated in the various figures and drawings.

BRIEF DESCRIPTION OF THE DRAWINGS

FIG. 3b is a front view of the embodiment shown in FIG. 3a;

FIG. 3c is a profile of the embodiment shown in FIG. 3a;

FIG. 4b is a front view of the embodiment shown in FIG. 4a;

FIG. 4c is a profile of the embodiment shown in FIG. 4a;

FIG. 5b is a front view of the embodiment shown in FIG. 5a;

FIG. 5c is a profile of the embodiment shown in FIG. 5a.

DETAILED DESCRIPTION

The present invention provides a cover structure 10 and an image output apparatus 20 including the cover structure 10. However, the cover structure 10 of the present invention is not limited to use with the image output apparatus 20. Structure 10 may also be used in connection with other apparatus of similar functionality.

Figure 1:
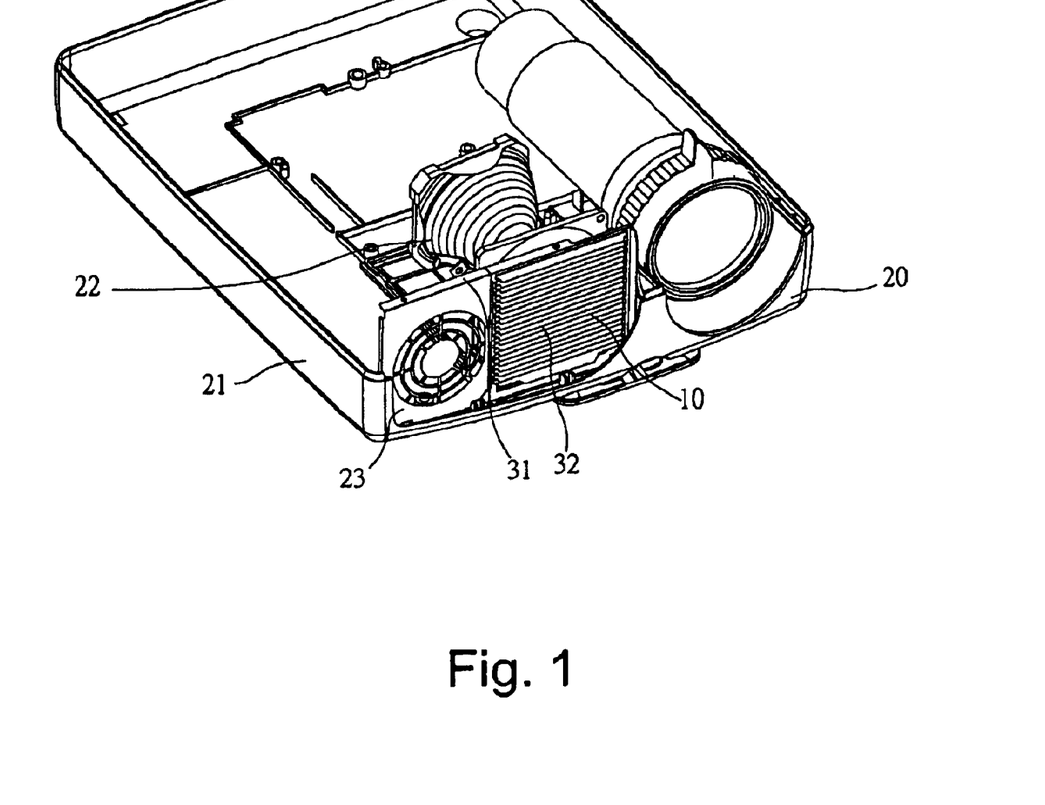
FIG. 1 shows an embodiment of the image output apparatus of the present invention.

Please refer to FIG. 1. FIG. 1 shows an embodiment of the image output apparatus 20 utilizing the cover structure 10. The cover structure 10 is disposed on the image output apparatus 20 for discharging and guiding airflow within the image output apparatus 20, as FIG. 1 shows. The image output apparatus 20 includes a housing 21 and a lamp 22 disposed within the housing 21. The housing 21 further includes a blowhole 23. In some embodiments, the image output apparatus 20 may be a projector, an overhead projector, a slide projector, and so on. The cover structure 10 is provided to mask light emitting from the blowhole 23.

Figure 2:
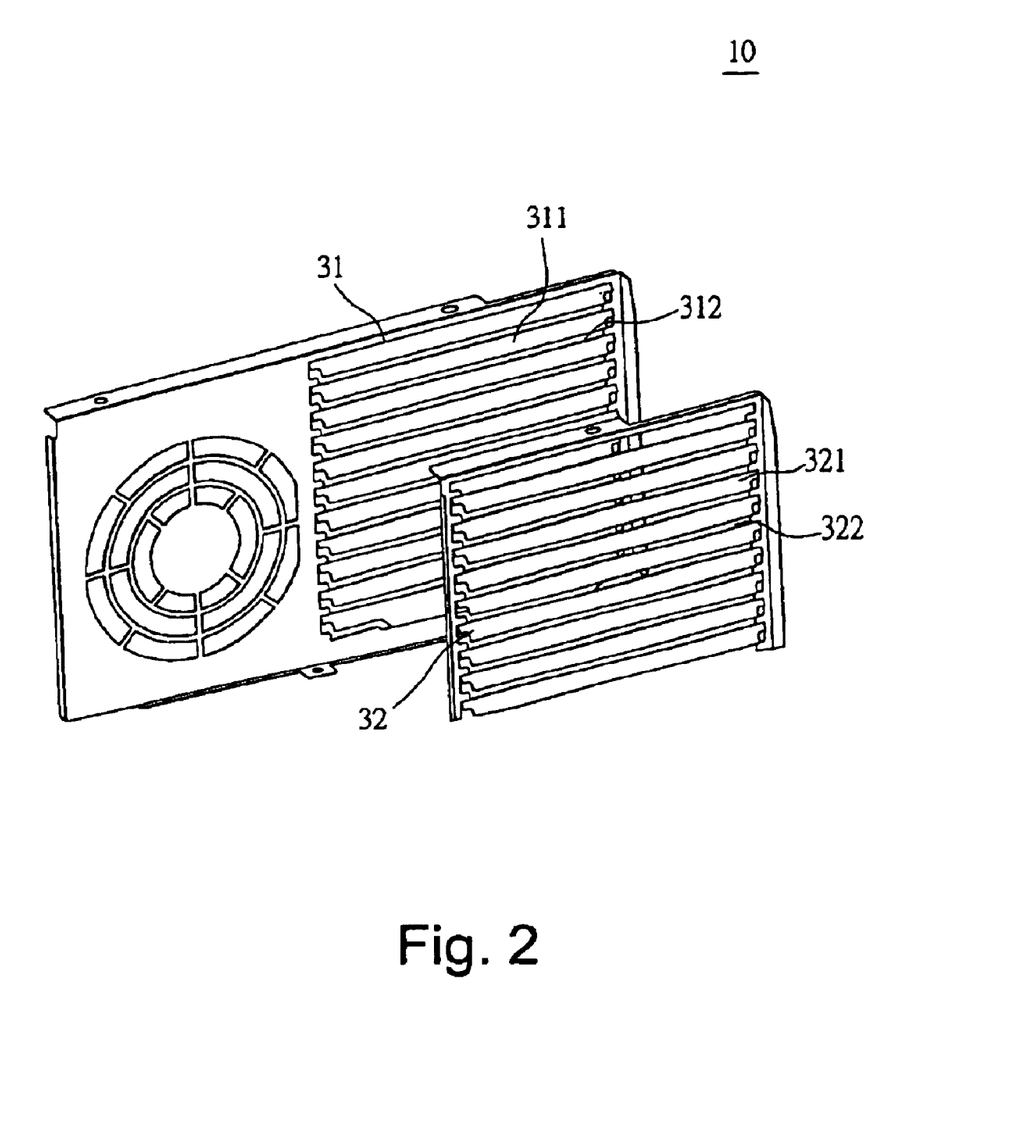
FIG. 2 is an exploded view of an embodiment of the present invention.

Please refer to FIG. 2. FIG. 2 is an exploded view of an embodiment of the present invention. The cover structure 10 includes a first device 31 and a second device 32. The first device 31 is disposed on the housing 21 and corresponds to the blowhole 23. Thus the first device 31 masks a portion of the light of the lamp 22 emitting from the blowhole 23. Some portion of the light emitted from the lamp 22 leaks from the first device 31 to form a leakage light 40. The second device 32 corresponds to an outer side of the first device 31 to mask the leakage light 40.

Figure 3A:
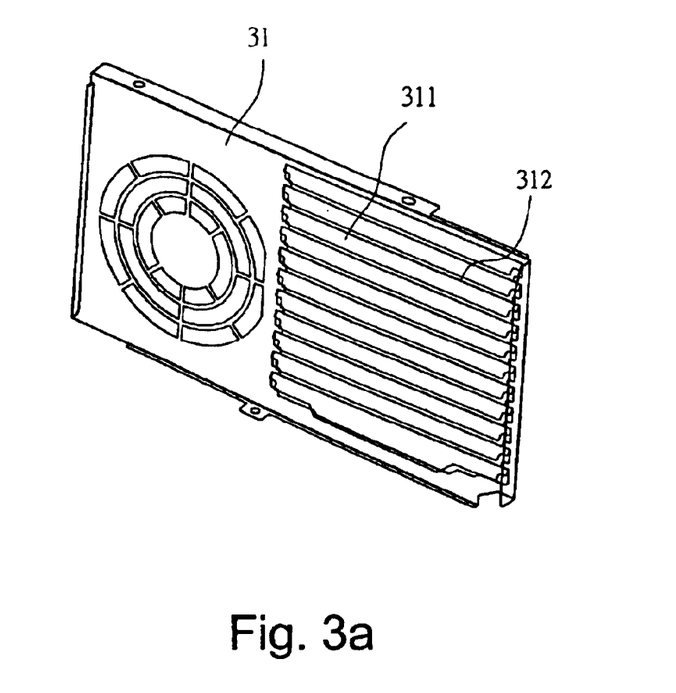
FIG. 3a shows an embodiment of the first device of the present invention.
Figure 3B:
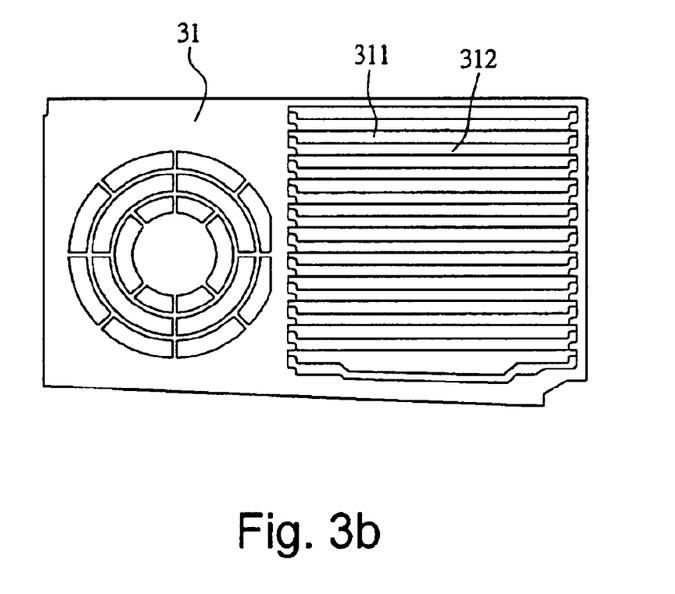
Figure 3C:
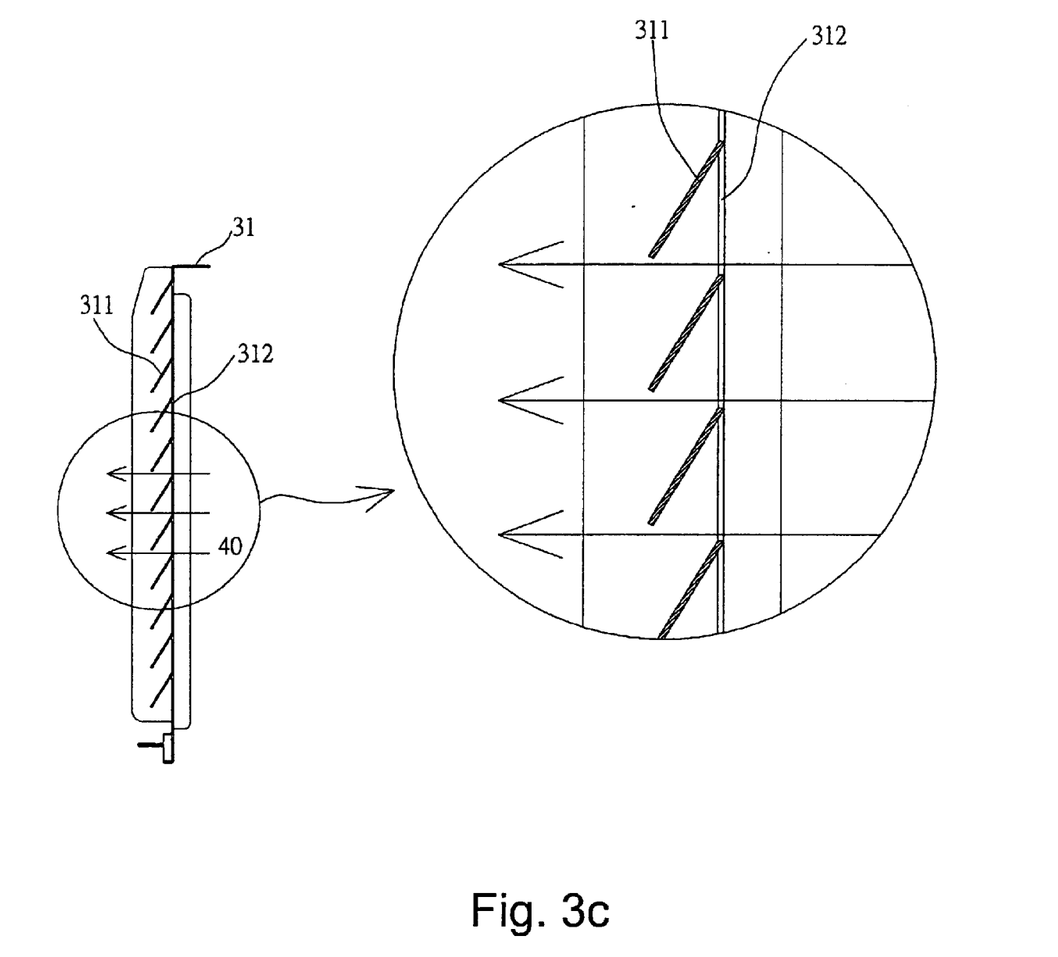

Please refer to FIGS. 3a, 3b, and 3c. FIG. 3a shows an embodiment of the first device 31 of the present invention. FIGS. 3b and 3c are respectively a front view and a profile of the embodiment shown in FIG. 3a. The first device 31 further includes at least one first vane 311 and at least one first vent 312, as FIGS. 3a and 3b show. Each first vane 311 corresponds to a first vent 312. A portion of light of the lamp 22 emitted from the first vent 312 is masked by the first vane 311, and some other portion leaks from the first vane 311 to form the leakage light 40, as FIG. 3c shows.

In an embodiment of the present invention, the first device 31 is made by metal plate to reduce the flow resistance encountered while discharging the heated air. The first vane 311 and the first vent 312 corresponding to the first vane 311 are formed by pressing the metal plate. However, the first device 31 is not limited to be made by the material and the method described above.

Figure 4A:
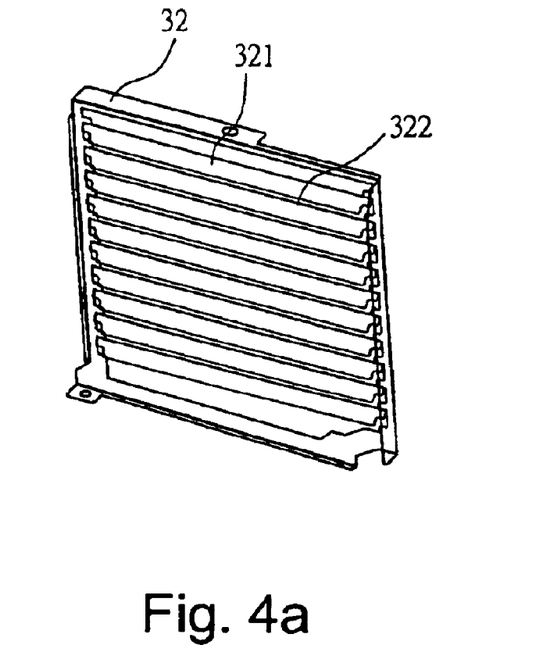
FIG. 4a shows an embodiment of the second device of the present invention.
Figure 4B:
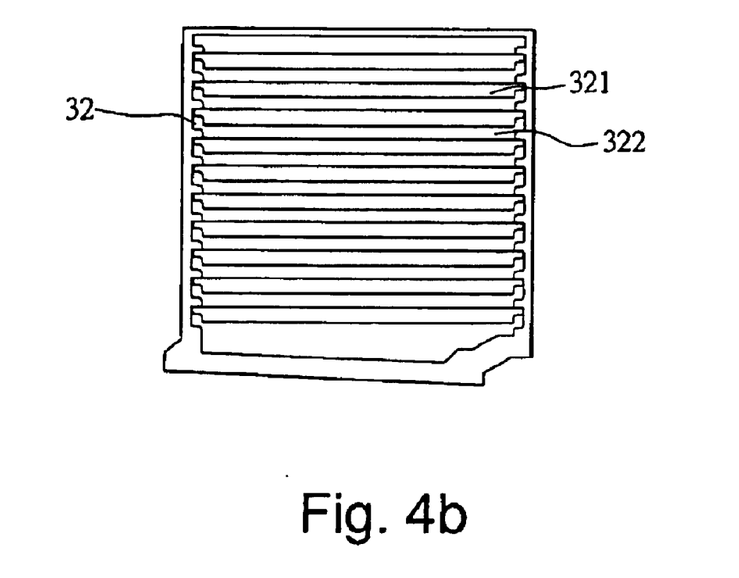
Figure 4C:
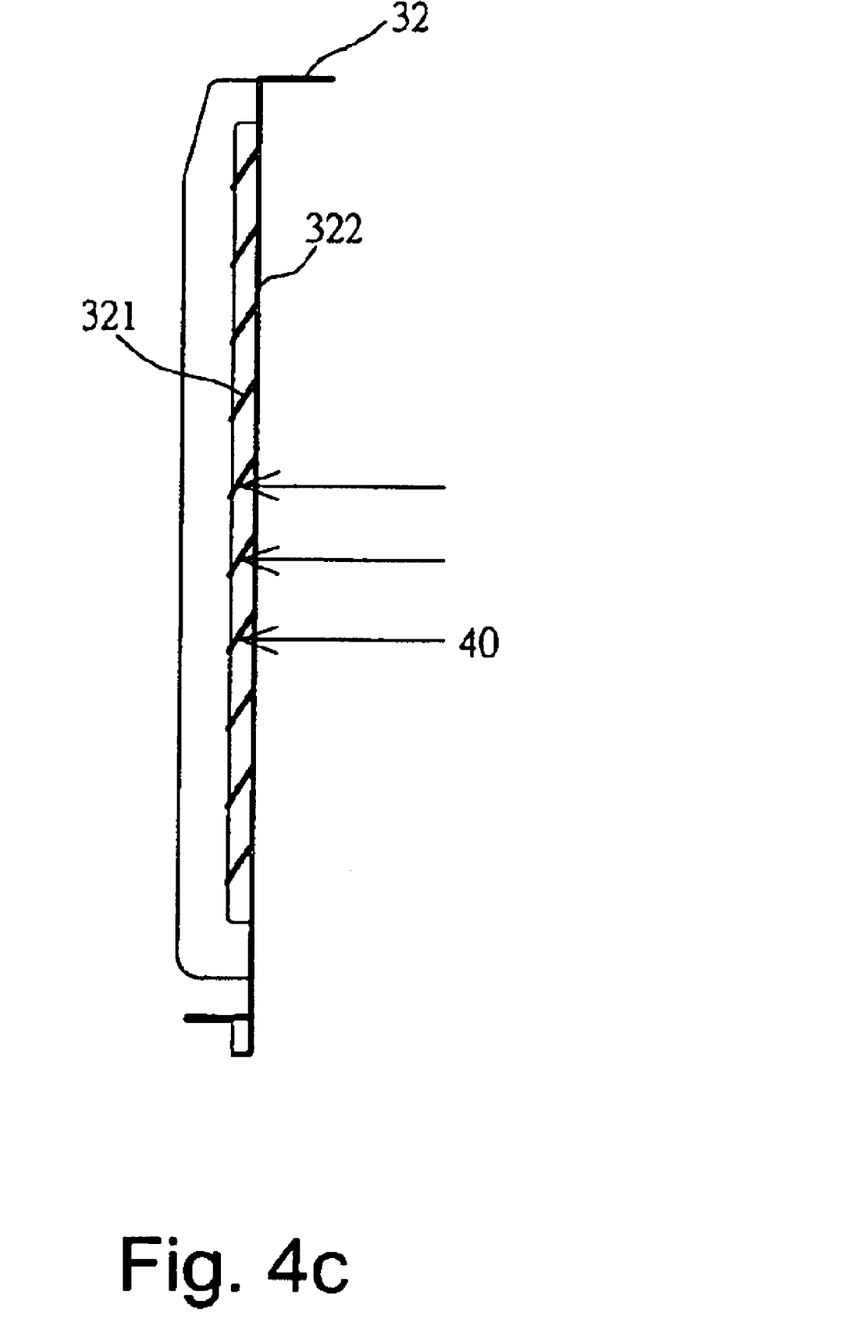

Please refer to FIGS. 4a, 4b, and 4c. FIG. 4a shows an embodiment of the second device 32 of the present invention, and FIGS. 4b and 4c are a front view and a profile of the embodiment shown in FIG. 4a respectively. The second device 32 further includes at least one second vane 321 and at least one second vent 322, as FIGS. 4a and 4b show. Each second vane 321 corresponds to a second vent 322. The second vane 321 is so arranged as to correspond to the leakage light 40 leaking from the first vane 311, as FIG. 4c shows. The leakage light 40 may thus be masked.

In an embodiment of the present invention, the second device 32 is made by metal plate to reduce the flow resistance encountered while discharging the heat air. The second vane 321 and the second vent 322 corresponding to the second vane 321 are formed by pressing the metal plate. However, the second device 32 is not limited to be made by the material and the method described above.

Figure 5A:
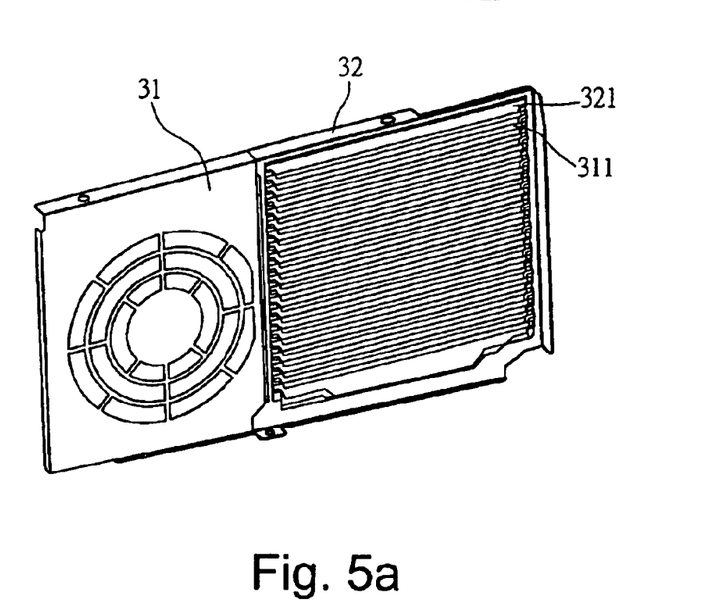
FIG. 5a shows an embodiment of the present invention.
Figure 5B:
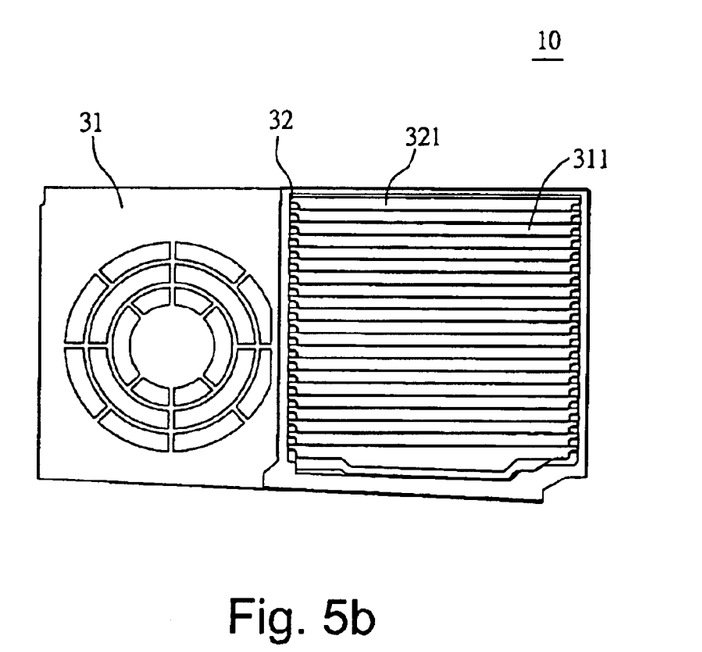
Figure 5C:
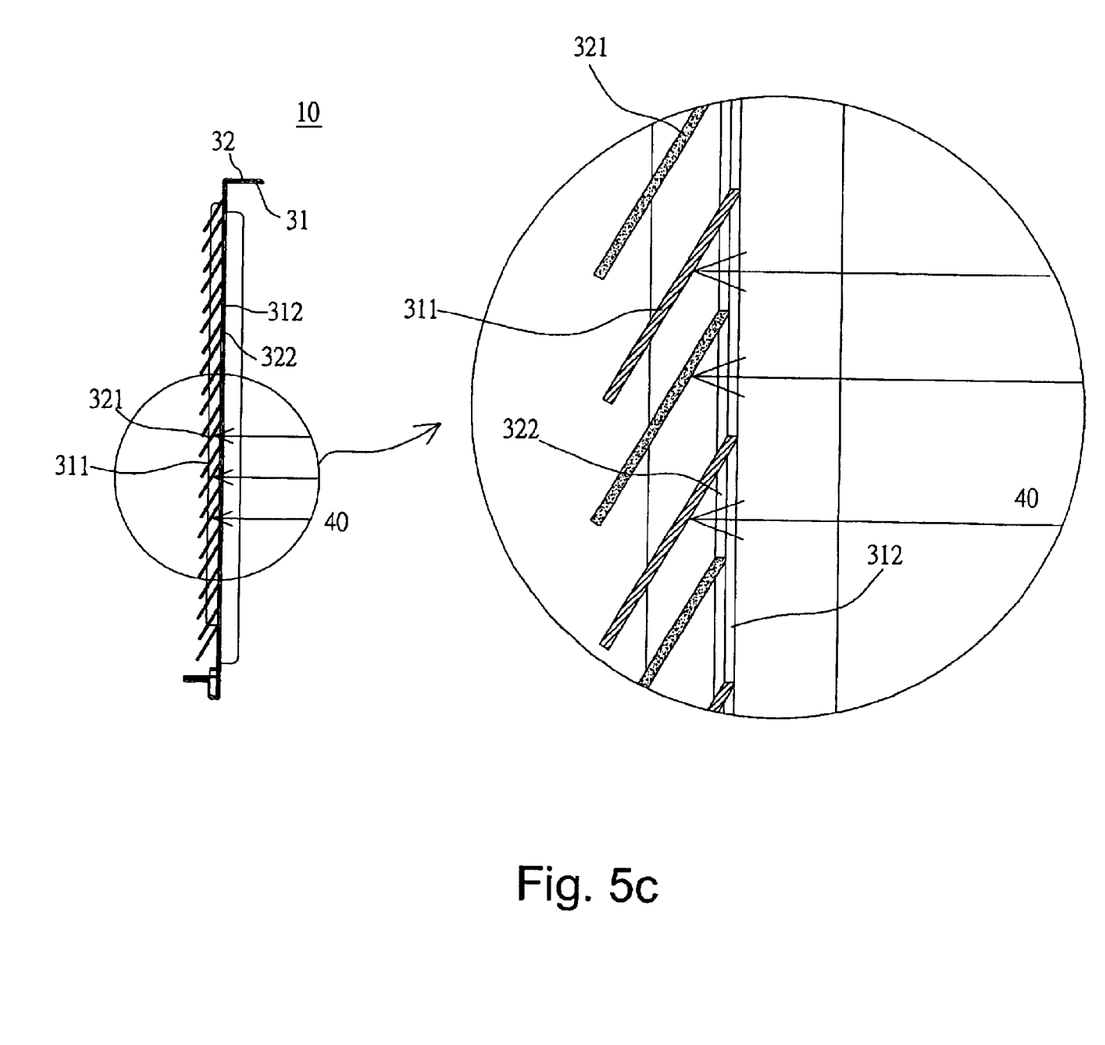

In a preferred embodiment of the present invention, as FIGS. 5a and 5b show, the second vent 322 allows passage of the first vane 311. Thus the second vane 321 may mask the leakage light 40 leaking from the first device 31, as FIG. 5c shows. This embodiment further reduces the required space for disposing the cover structure 10. However, in another embodiment (not shown), the first device 31 and the second device 32 are adjacent to each other with the vane not passing through the vent. In this way, the second vane 321 may mask the leakage light 40.

In the embodiment described above, the width of the second vent 322 is larger than the width of the first vane 311, such that the first vane 311 easily passes through the second vent 322.

In an embodiment of the present invention, the second vane 321 is parallel to the first vane 311 for easily masking the leakage light 40 leaking from the first vane 311.

The cover structure 10 of the present invention may direct the airflow discharged from the blowhole 23 by adjusting the first vane 311 and the second vane 321. In an embodiment, when the cover structure 10 is disposed on the image output apparatus 20, the first and the second vanes 311, 321 may be adjusted to direct the discharged airflow away from the output image. Thus the discharged airflow would not adversely effect the output image.

In an embodiment of the present invention, a additional plastic cover may be disposed on an outer side of the cover structure 10 for decoration purpose. When the temperature of the cover structure 10 raises due to discharging of the airflow, the additional plastic cover may prevent that users from touching the cover structure 10.

The above description sets forth various exemplary embodiments of the invention only, and is not intended to limit the scope, applicability, or configuration of the invention in any way. Rather, various changes may be made in the function and arrangement of the elements described in these embodiments without departing from the spirit and scope of the invention. Thus, the protected scope of the present invention is as set forth in the appended claims.

What is claimed is:

1. A cover structure for use with a blowhole of an apparatus, said apparatus comprising a housing and a lamp, said housing including the blowhole and said lamp being arranged in the housing, the cover structure comprising:

a first device corresponding to the blowhole for masking light emitting from the blowhole, a portion of the emitted light leaking from said first device to form a leakage light, said first device including at least one first vane and at least one first vent; and a second device disposed adjacent to an outer side of said first device, said second device comprising at least one second vane and at least one second vent, said second vane corresponding to and passing through said first vent and being interposed between two adjacent first vanes for masking said leakage light.

2. The structure of claim 1, wherein said first vane is parallel to said second vane.

3. The structure of claim 1, wherein said first vane and said second vane together direct airflow passing through said blowhole.

4. A cover structure for use with a blowhole of an apparatus, said apparatus comprising a housing and a lamp, said housing including the blowhole and said lamp being arranged in the housing, the cover structure comprising: a first device corresponding to the blowhole for masking light emitting from the blowhole, said first device including at least one first vane and at least one first vent, a portion of the emitted light leaking from said first vane to form a leakage light; and a second device disposed on an outer side of said first device, said second device including at least one second vane and at least one second vent, said second vent allowing passage of said first vane; wherein said second vane corresponds to said first vent and said first vane is parallel to said second vane for masking said leakage light.

5. The structure of claim 4, wherein said first vane and said second vane together direct airflow passing through said blowhole.

6. An image output apparatus, comprising:

a housing including a blowhole;

a lamp being arranged in said housing; and a cover structure including;

a first device corresponding to the blowhole for masking light emitting from the blowhole, said first device including at least one first vane and at least one first vent, a portion of the emitted light leaking from said first vane to form a leakage light; and a second device disposed on an outer side of said first device, said second device including at least one second vane and at least one second vent, said second vane corresponding to and passing through said first vent and being interposed between two adjacent first vanes for masking said leakage light.

7. The image output apparatus of claim 6, wherein said first vane is parallel to said second vane.

8. The image output apparatus of claim 6, wherein said first vane and said second vane together direct airflow passing through said blowhole.

* * * * *